United States Patent [19]

Fradenburgh et al.

[11] Patent Number: 4,591,400

[45] Date of Patent: May 27, 1986

[54] METHOD OF FORMING A FIBER REINFORCED COMPOSITE ARTICLE OF A COMPLEX CONFIGURATION

[75] Inventors: Evan A. Fradenburgh, Fairfield; Edmond F. Kiely, Stratford; Gordon G. Miller, Shelton, all of Conn.

[73] Assignee: United Technologies Corporation, Hartford, Conn.

[21] Appl. No.: 610,371

[22] Filed: May 15, 1984

[51] Int. Cl.⁴ .............................................. B29C 65/00
[52] U.S. Cl. ..................................... 156/80; 156/173; 156/194; 156/245; 264/28; 264/137; 264/257; 264/334
[58] Field of Search ............... 264/257, 135, 136, 137, 264/334, 28, 278, 263, 258, 237, 348, 272.18, 336, 234, DIG. 68, DIG. 66, DIG. 53; 249/93, 63; 156/80, 173, 194, 195, 245

[56] References Cited

U.S. PATENT DOCUMENTS

| 2,209,509 | 7/1940 | Carr | 264/28 |
| 3,044,922 | 7/1962 | Kappel | 264/324 |
| 3,476,625 | 11/1969 | Slivinsky et al. | 156/86 |
| 3,943,020 | 3/1976 | Ashton et al. | 156/156 |
| 4,251,309 | 2/1981 | Class et al. | 156/245 |
| 4,329,306 | 5/1982 | Crivello | 264/137 |
| 4,426,193 | 1/1984 | Carlson | 416/229 A |
| 4,512,836 | 4/1985 | Tucci | 156/174 |

Primary Examiner—Donald Czaja
Assistant Examiner—Mary Lynn Fertig
Attorney, Agent, or Firm—Alan C. Cohen

[57] ABSTRACT

The present invention is a method of making fiber reinforced composite articles using match molds to compact a partially hollow fiber/matrix lay-up. The method comprises wrapping the matrix and fiber reinforcement about a mandrel, removing the mandrel from the lay-up or chilling the wrapped mandrel allowing for easy removal of the mandrel resulting in a relatively stiff hollow lay-up. The lay-up is then placed in a mold and compacted and cured to form the desired composite article. Such a method provides an easy method to form such complex composite article shapes as I-beam, C-beam, etc.

8 Claims, 5 Drawing Figures

U.S. Patent  May 27, 1986  4,591,400
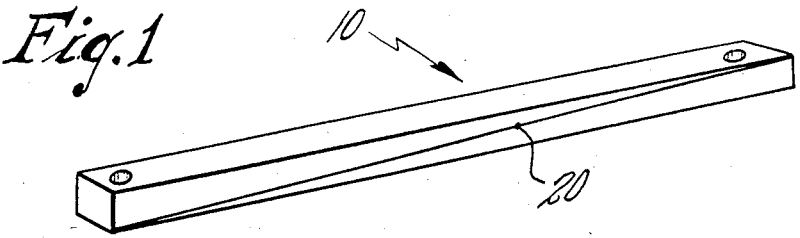
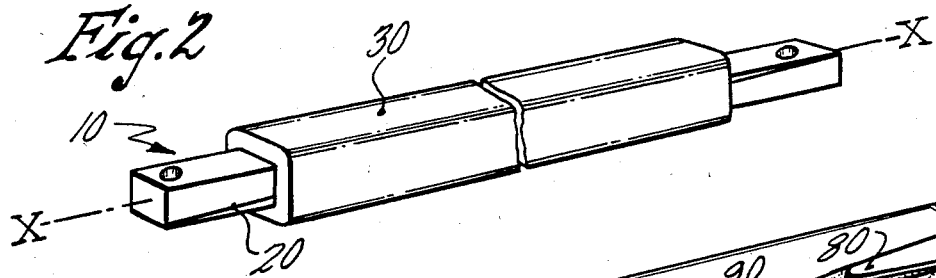
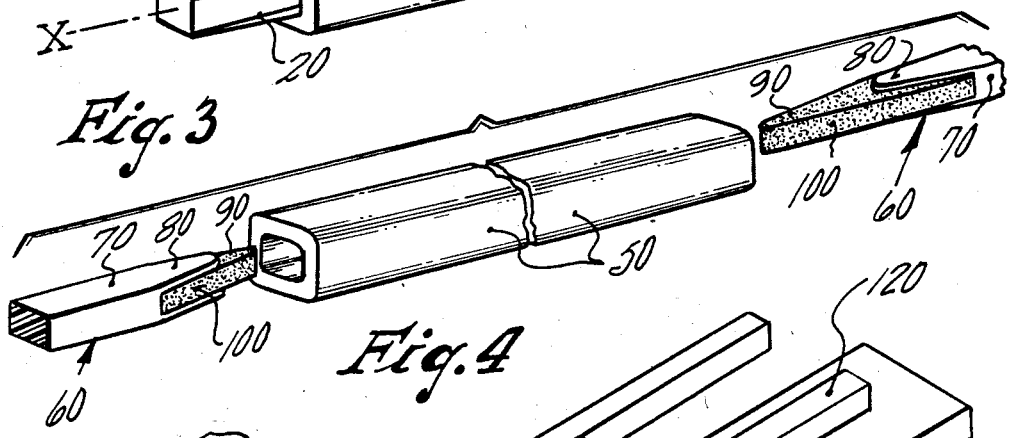
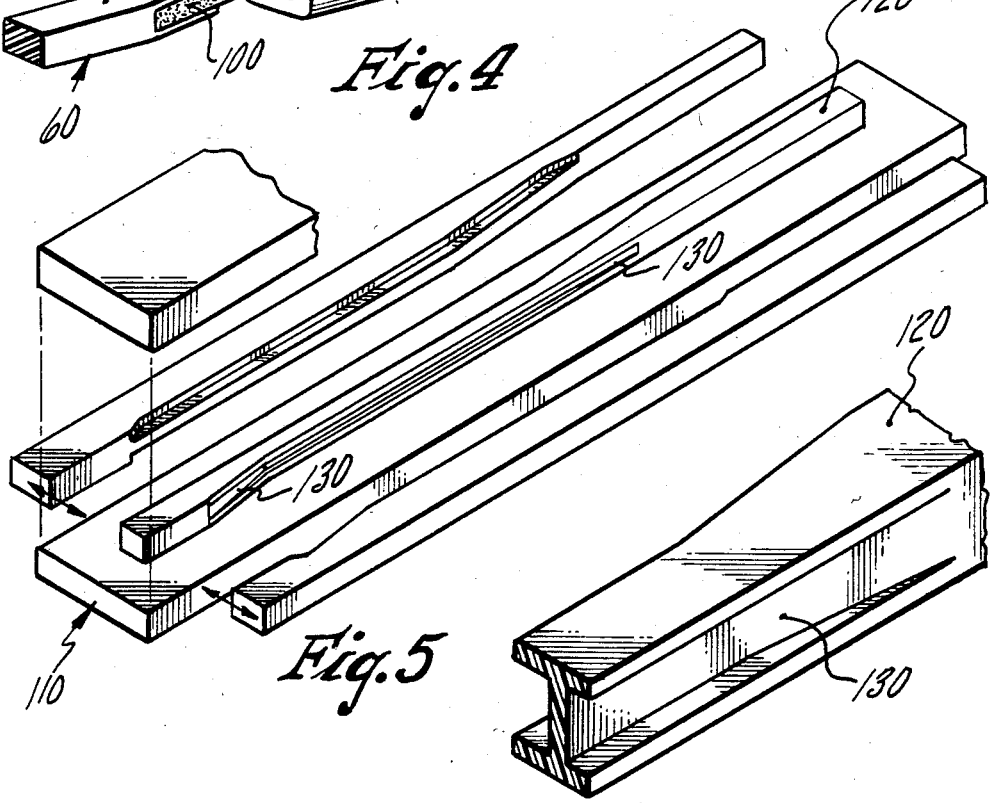

METHOD OF FORMING A FIBER REINFORCED COMPOSITE ARTICLE OF A COMPLEX CONFIGURATION

CROSS REFERENCE TO RELATED APPLICATIONS

This application relates to U.S. application Ser. No. 610,370, filed on even date herewith by Evan A. Fradenburgh, Edmond F. Kiely and Gordon G. Miller for a COMPOSITE FLEXBEAM FOR A ROTARY WING AIRCRAFT and is herein incorporated by reference.

DESCRIPTION

1. Technical Field

The technical field to which this invention pertains is fiber reinforced composites and in particular, the molding or forming of such composite articles in complex shapes.

2. Background Art

A number of methods for forming fiber reinforced composite aricles have been described in the prior art. Typically, these methods incorporate wrapping the resin impregnated fiber reinforcement about a form or mandrel forming a lay-up of the uncured resin and fibers. The lay-up and the mandrel are then placed into a female matched mold and under pressure, contoured to the desired shape of the mold. Heat is then applied curing the matrix and forming the composite article.

In such operations, the mandrel may be an inflatable one which is pressurized to maintain the shape of the composite article during its formation and is then removed by deflating and withdrawing it from the cured article. An alternative approach is to use a solid or rigid mandrel about which the matrix impregnated fibers may be wrapped, again forming a lay-up. The lay-up and mandrel are then placed in a mold and under pressure and heat cured to form the composite article. The mandrel may then be left inside of the composite article, giving rigid support to it or it may be removed by bisecting the composite article and removing it.

The above cited methods, however, do not fully lend themselves to the formation of composite articles having complex shapes such as I-beams, or other shapes where a portion of the structure is tightly compacted and other portions retain substantially a broader profile. In addition, if the mandrel used was of metal, it would add weight to the article as well as requiring high pressure to form the article. In the event that an inflatable mandrel is used and left in the composite, it may result in in structurally inferior product.

Therefore, what is needed in the art is a method for making such complex configuration of fiber reinforced composite materials which overcomes the problem of the prior art.

DISCLOSURE OF THE INVENTION

The present invention is directed toward a method of making fiber reinforced composite articles of complex configuration.

After forming a lay-up about a mandrel, the mandrel is then removed from the lay-up resulting in a hollow, substantially self-supporting structure, which is then placed in a matched mold and compacted into the desired shape. The composite is then cured while in the mold to product the desired composite flexbeam.

An alernate method is also described wherein the lay-up, which is produced about the mandrel, is chilled to a temperature which effects easy removal of the mandrel from the lay-up.

The present method may also be used to make a fiber reinforced composite flexbeam having internally reinforced sections and reinforced compacted sections.

The foregoing and other features and advantages of the present invention will become more apparent in the light of the following description and accompanying drawing.

BRIEF DESCRIPTION OF THE DRAWINGS

FIG. 1 shows a split, rectangular mandrel which may be used to practice this invention.

FIG. 2 shows a lay-up about the mandrel.

FIG. 3 shows the lay-up with the mandrel removed and reinforcements to be inserted.

FIG. 4 shows a typical matched mold and resulting composite structure.

FIG. 5 shows a cross section of the resulting composite flexbeam.

BEST MODE FOR CARRYING OUT THE INVENTION

Any substantially straight mandrel used to form fiber reinforced composites may be used. Typically, these mandrels may be formed out of steel but any other material which will hold its shape during the wrapping process and have sufficiently smooth surfaces to allow for easy withdrawal from the resulting lay-up may be used. These mandrels may be of any cross-sectional shape, i.e. square, oval, round, rectangular, etc. Although it is not necessary, it is desirable to have the mandrel split on a bias, longitudinally to facilitate ease of withdrawal from the lay-up. A typical mandrel 10 of this type is shown in FIG. 1.

The fiber reinforcement which may be used to practice this invention may be any of the conventional fiber materials used to make fiber reinforced composite articles. Typically, these are glass fibers, graphite, carbon, etc. The particular fiber reinforcement selected will depend on the physical properties desired in the resulting composite article; i.e. some of the fibers are stiffer than others while others may have poorer thermal properties. In addition, the fibers should also be compatible, chemically, thermally, etc. with the matrix material.

The fiber reinforcement may be in the form of a tow (a small bundle of fibers), a broadcloth, or a preimpregnated, unidirectional tape of broadgoods. The choice of form in most cases will be determined by the manner in which the article is to be formed about the mandrel. For example, if one were to use a winding machine to wrap the mandrel, the tows or monofilament would be preferred, whereas when a hand lay-up is preferred, the broadgoods would be more appropriate.

Additionally, the matrix material may be placed on the fiber reinforcement forming a prepreg prior to wrapping about the mandrel; or it may be coated onto the fibers after they have been wrapped. The matrix typically comprises from about 30% to about 70% by volume of the finished article. The matrix material may be impregnated by conventional, preimpregnation prior to wrapping or post-wrapping impregnation techniques.

The matrix material may be any of the conventional matrices used to form composite articles, i.e. epoxy, polyamide, polyimide, etc. The particular matrix chosen will depend on the physical properties desired in the final product, i.e. thermal stability, flexibility, fracture toughness, etc. The matrix should also be compatible with the fiber reinforcement, i.e. the curing cycle of the matrix should not exceed the thermal stability of the fiber reinforcement, etc.

The fiber reinforcement is then tightly wrapped about the mandrel to the desired thickness and at the desired angle using any conventional technique, i.e. hand wrapping, filament winding machine, etc. The thickness of the wrap is dependent on the thickness and stiffness of the final composite article and the ability to compact it in the mold. Typically, the angle at which the fibers are wrapped (±15, ±30, etc., to the longitudinal axis or combination of angles) depends again, on the particular properties desired in the final article, i.e. flexibility etc. However, the fibers do not have to be wrapped in the sense of following a geodesic path with a filament winding machine. They can be laid up with fibers at any desirable angles and need not necessarily be equal and opposite (±).

When the lay-up is completed, the wrapped mandrel is then removed, resulting in a hollow, substantially self-supporting structure. A preferred method of removing the mandrel is to chill the lay-up and mandrel to a temperature sufficiently low enough to where it is not tacky and the hollow structure resulting from the removal of the mandrel will not collapse upon itself. This temperature will vary depending on the particular matrix material used, the size of the fiber reinforcement and its modulus as well as the thickness of the lay-up. Typically, the temperature should be less than 0° F. ($-17.8°$ C.). The lay-up may be chilled by any conventional freezer, ice box, liquid, gas (i.e. $O_2$, $N_2$, etc.) or other technique.

Once the lay-up and mandrel have been cooled to the desired temperature, the mandrel can then be removed. This may be done by gripping the chilled lay-up and tapping out the mandrel. In the case of the preferred mandrel, the longitudinally biased split makes mandrel removal quite easy, because of the taper to the mandrel pieces.

Once the mandrel has been removed, the hollow lay-up may then be placed into a matched mold to be formed into the final composite shape. The mold may be any type of match mold configured to press the hollow lay-up into the desired configuration. The mold may be of steel or other rigid material which will not deform when compacting the lay-up or when subsequently curing a composite matrix. These match molds are conventional and do not constitute part of this invention. It may be helpful where the lay-up was chilled, especially when small parts are being formed, to allow the hollow lay-up to warm up a bit and become more pliable making assembly of the match mold easier.

After the mold has been fitted together and the article compacted, the mold is placed into a conventional curing system and the composite article is cured. The particular curing system, i.e. heat, heat and vacuum, etc. will depend on the particular matrix system used, as will the curing cycle, i.e. temperature, times, etc.

After the article has been cured, the mold is disassembled and the finished composite article, in near net form, is removed.

This process may be used to form composite structures which have portions which are compacted and other portions which are internally reinforced with stiffeners. These stiffeners are incorporated into the composite structure by inserting a preformed stiffener inside of the hollow lay-up, preferably while still chilled and prior to compaction. The stiffener(s) may be comprised of a fiber reinforced composite, i.e. graphite fiber reinforced epoxy, etc. metal, wood, etc. Such stiffeners may be formed using conventional techniques and shaped to predetermined size. The stiffener(s) is then inserted into the hollow lay-up at the proper position. Such stiffeners may be formed and cured prior to their introduction into the hollow lay-up or they may be formed and placed in the lay-up and co-cured along with the hollow lay-up during the compacting and curing cycle. (These stiffeners may be bonded into position by an adhesive which may be placed on the surface(s) of the stiffener prior to introduction into the hollow lay-up.) The hollow lay-up, with the stiffener, is then inserted into the matched mold and compacted as before.

As described in the Example, this process is well suited for forming composite structures of I-beam or modified I-beam configuration having integral reinforcing portions. These structures may be structural components which are designed for stiffness or they may be used in rotary wing aircraft as flexbeams which have reinforced stiff areas and nonreinforced flexible areas.

EXAMPLE

A torsional flexbeam was prepared using the disclosed process as follows:

A rectangular mandrel 10 (FIG. 1) which was split diagonally 20 along its longitudinal axis was used. The mandrel was about 0.40 inch square and about 15 inches in length and made of steel. Four layers of preimpregnated glass fibers 30 (FIG. 2) were wrapped tightly about the mandrel 10. The cloth 30 was wrapped such that the fiber orientation was ±15° to the longitudinal axis of the mandrel. The cloth 30 was purchased from the 3-M Corporation and comprised E-Glass and SP 114 resin.

The layers were wrapped such that the end of each layer was on a different side of the mandrel 10. Each layer was 0.0068 inch thick and the resulting lay-up composite was 0.028 inch thick.

The resulting lay-up and mandrel were then placed in a plastic bag and put into a freezer to cool them down to 0° F. ($-17.8°$ C.). The plastic bag was used to reduce moisture absorption from the freezer onto the lay-up.

After the lay-up had cooled to temperature, it was removed from the freezer, and taken out of the plastic bag. While still cold, the mandrel 10 was removed from the chilled lay-up by tapping it free with a hammer and drawing it out of the lay-up, leaving a stiff, cold, hollow lay-up 50 (FIG. 3).

Reinforcing doublers 60, which had been prepared earlier, were then inserted into each end of the hollow chilled lay-up 50. The doublers 60 comprised graphite reinforced epoxy resin composites 70 which were layed up and cured using conventional techniques. These doublers were made by stacking ten layers of graphite fiber broadcloth, preimpregnated with RAC 6350 epoxy, alternating each layer 0/±90 to the previous layer. The resulting stack was then cured and was molded to fit snuggly inside of the hollow lay-up 50. These doublers 60 were made such that they had a clevis 80 at one end in which to insert a preformed foam structure 90. The foam structure 90 was designed with a ramp 100 on one surface to impart a ramp shape to the final composite article after compaction. One doubler 60 was four inches long while the other was 1.5 inches long. The foam inserts 90 were 2.5 inches long and 1 inch long respectively. These foam inserts 90 were attached to the doublers 60 by an adhesive (EA 9309.3NA available from Hysol Corporation).

The doublers 60 with the foam inserts 90 were coated with AF 126-2 (available from the 3-M Corporation), adhesive and then placed into the chilled, hollow, lay-up 50 with the foam ramp surfaces of each doubler facing 180° from each other. The resulting reinforced lay-up was then wrapped in a positioning fabric to reduce its surface tack, placed into the mold 110 and the mold was assembled, shaping the hollow lay-up into the desired form 120. The mold 110 was then clamped together with bolts, fixtured with shear pins and heated for 2 hours at a temperature of 250° F. (121.1° C.) to cure the resin matrix.

It was determined that in making composite articles having longitudinally oriented ramped portions, the ramped portion must be made long enough and at a gentle enough angle (less than about 10°), to avoid fibers wrinkling during compaction. FIG. 5 shows a section of the ramped portion 130 of the final composite article.

The mold was then cooled and disassembled and the finished flexbeam 100 removed.

The resulting composite article was of near net shape and contained continuous fibers throughout that portion of the article formed from the hollow lay-up. Such continuity of fibers produces a structurally superior composite article to those having discontinuous fibers.

This process is ideally suited for the production of I-beams, C-beams and other like articles which have compacted areas. In addition, through the proper placement of stiffeners and the like, composite articles which have torsionally soft, resilient portions and torsionally stiff portions may be easily manufactured as well. Such articles will find uses as flexbeams in rotor wing aircraft for attaching rotor blades to rotor hubs.

Although the invention has been shown and described with respect to detailed embodiments thereof, it should be understood by those skilled in the art that various changes and omissions in form and detail may be made therein without departing from the spirit and the scope of the invention.

We claim:

1. A method of making a composite flexbeam of complex configuration having an inboard end and an outboard end comprising:
    (a) forming a lay-up of fiber reinforcing material and matrix material about a rectangular mandrel,
    (b) chilling the lay-up to a temperature at which the lay-up will substantially retain its shape when the mandrel is removed,
    (c) removing the mandrel from the formed, chilled, hollow lay-up,
    (d) inserting, while still chilled, reinforcing doublers into the inboard and the outboard ends,
    (e) placing a matched mold about the exterior of the chilled, reinforced lay-up and forming the lay-up, under pressure to conform to the mold,
    (f) applying sufficient heat to the lay-up to cure the matrix and form the complex configured composite article a portion of which is not hollow.
2. The method of claim 1 wherein the fiber reinforcement is glass fibers, the matrix material is epoxy and the reinforcing doublers are comprised of graphite fibers and epoxy resin.
3. A method of making a composite article of complex configuration comprising:
    (a) forming a lay-up of fiber reinforcing material and uncured matrix material about a mandrel,
    (b) chilling the matrix material to a temperature wherein the matrix material is no longer tacky and the mandrel is easily removed from the lay-up,
    (c) removing the mandrel from the lay-up,
    (d) placing a matched mold about the exterior of the hollow lay-up and forming the lay-up under pressure to conform to the mold, and
    (e) curing the matrix material to form the composite article a portion of which is not hollow.
4. The method of claim 3 wherein said matched mold cavity describes an article having first and second substantially rigid end portions and a torsionally flexible medial portion.
5. The method of claim 4 wherein the flexible medial portion is substantially I-shaped in cross section.
6. The method of claim 5 wherein the substantially I-shaped cross-sectional medial portion is characterized by a central web of increasing thickness in longitudinally opposite directions.
7. A method of making a composite article of complex configuration comprising:
    (a) forming a lay-up of fiber reinforcing material and uncured matrix material about a mandrel,
    (b) chilling the lay-up to a temperature wherein the matrix material is no longer tacky and the mandrel is easily removed from the lay-up;
    (c) removing the mandrel from the lay-up,
    (d) inserting reinforcing doublers into at least one end of the chilled hollow lay-up,
    (e) placing a matched mold about the exterior of the hollow lay-up and forming the lay-up, under pressure to conform to the mold, and
    (f) curing the matrix material to form the composite article.
8. A method of making a composite article of complex configuration comprising:
    (a) forming a lay-up of fiber reinforcing material and uncured matrix material about a mandrel,
    (b) chilling the lay-up to a temperature wherein the matrix material is no longer tacky and the mandrel is easily removed from the lay-up,
    (c) removing the mandrel from the lay-up,
    (d) wrapping the chilled hollow lay-up in a layer of positioning fabric,
    (e) placing a matched mold about the exterior of the hollow lay-up and forming the lay-up under pressure to conform to the mold,
    (f) curing the matrix material to form the composite article a portion of which is not hollow.

* * * * *